(12) United States Patent
Åström et al.

(10) Patent No.: US 11,363,534 B2
(45) Date of Patent: Jun. 14, 2022

(54) MULTI-RAT WIRELESS COMMUNICATION

(71) Applicant: Telefonaktiebolaget LM Ericsson (publ), Stockholm (SE)

(72) Inventors: Magnus Åström, Lund (SE); Andres Reial, Malmö (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 10 days.

(21) Appl. No.: 15/561,380

(22) PCT Filed: Aug. 21, 2017

(86) PCT No.: PCT/SE2017/050835
§ 371 (c)(1),
(2) Date: Sep. 25, 2017

(87) PCT Pub. No.: WO2019/039975
PCT Pub. Date: Feb. 28, 2019

(65) Prior Publication Data
US 2019/0059051 A1 Feb. 21, 2019

(51) Int. Cl.
*H04W 52/02* (2009.01)
*H04W 76/15* (2018.01)
*H04W 88/06* (2009.01)
*H04W 36/00* (2009.01)

(52) U.S. Cl.
CPC ..... *H04W 52/028* (2013.01); *H04W 52/0235* (2013.01); *H04W 52/0264* (2013.01); *H04W 52/0274* (2013.01); *H04W 76/15* (2018.02); *H04W 88/06* (2013.01); *H04W 36/0085* (2018.08)

(58) Field of Classification Search
CPC .......... H04W 88/06; H04W 36/0085; H04W 52/0235; H04W 52/0264; H04W 52/0274; H04W 52/028; H04W 76/15; Y02D 30/70
See application file for complete search history.

(56) References Cited

U.S. PATENT DOCUMENTS

| | | | | |
|---|---|---|---|---|
| 9,136,892 | B2* | 9/2015 | Ghosh | H04B 1/16 |
| 9,155,037 | B2* | 10/2015 | Awoniyi | H04W 52/0203 |
| 9,913,216 | B1* | 3/2018 | Deshpande | H04W 4/80 |
| 2011/0183694 | A1* | 7/2011 | Han | H04W 48/16 |
| | | | | 455/507 |
| 2015/0156717 | A1 | 6/2015 | Narasimha et al. | |

(Continued)

*Primary Examiner* — Asad M Nawaz
*Assistant Examiner* — Zhaohui Yang
(74) *Attorney, Agent, or Firm* — Coats + Bennett, PLLC

(57) ABSTRACT

A wireless communication device (12) is configured for use in a wireless communication system (10). The wireless communication device (12) comprises a first radio access technology, RAT, module (18-1) configured to perform functions relating to a first RAT. The wireless communication device (12) also comprises a second RAT module (18-2) configured to perform functions relating to a second RAT and perform a subset (22-1S) of the functions relating to the first RAT on behalf of the first RAT module (18-1). In some embodiments, the first RAT module (18-1) is configured to operate in a low-power mode, a sleep mode, or a disabled mode when the second RAT module (18-2) handles performance of the subset (22-1S) of the functions relating to the first RAT on behalf of the first RAT module (18-1).

34 Claims, 10 Drawing Sheets

(56) References Cited

U.S. PATENT DOCUMENTS

| | | | |
|---|---|---|---|
| 2015/0257041 A1* | 9/2015 | Su | H04W 36/0016 |
| | | | 455/437 |
| 2015/0304950 A1* | 10/2015 | Li | H04W 52/0216 |
| | | | 370/311 |
| 2016/0128128 A1* | 5/2016 | Ang | H04W 52/0222 |
| | | | 370/311 |
| 2016/0219589 A1* | 7/2016 | Khawer | H04W 24/02 |
| 2020/0120756 A1* | 4/2020 | Wang | H04W 24/10 |

* cited by examiner

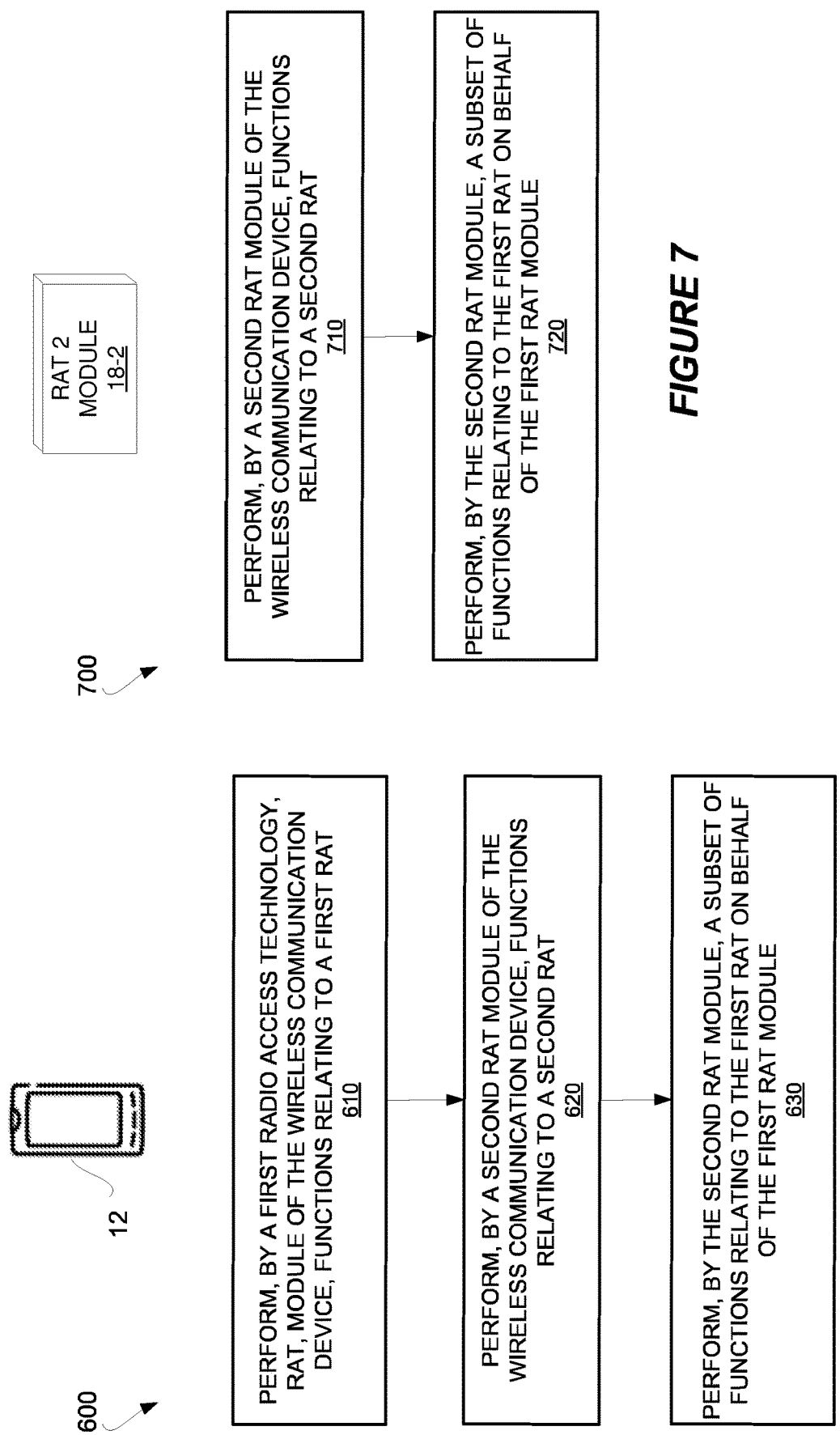

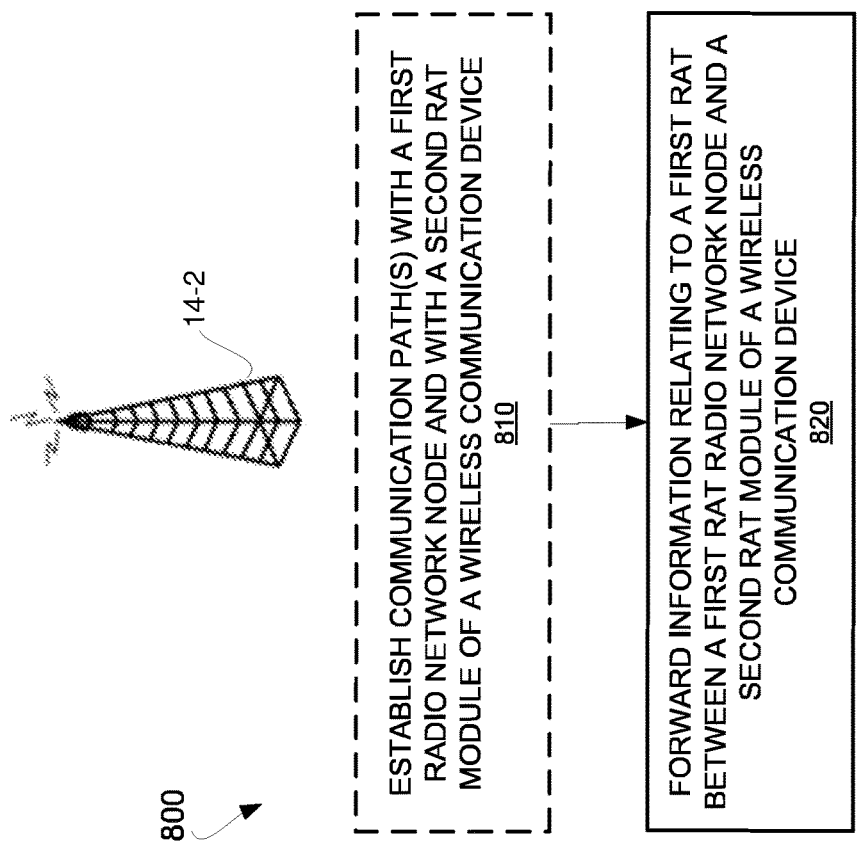

MULTI-RAT WIRELESS COMMUNICATION

TECHNICAL FIELD

The present application relates generally to wireless communication and particularly to wireless communication using multiple radio access technologies, RATs.

BACKGROUND

For the foreseeable future, a variety of different radio access technologies (RATs) will exist in parallel. For example, the 3rd Generation Partnership Project (3GPP) and the 3GPP2 have simultaneously developed competing RAT standards, based on Wideband Code Division Multiple Access (WCDMA) and CDMA2000, respectively. Even 3GPP itself develops different RAT standards, some evolutionary with a concern for backwards compatibility and some revolutionary with a focus on performance irrespective of backwards compatibility. The same can be said of 3GPP2. Furthermore, as 3GPP and 3GPP2 continue to develop their respective RAT standards, each develop different technology stages or releases (e.g., 3GPP provides different releases of LTE, including Release 13, 14, etc.). In addition to these technologies, wireless local area network (WLAN) and "WiMax" technologies may be widely available, often side-by-side with other technologies and with each other.

With such a variety of RATs available, multiple wireless operators may deploy different RATs in any given area, with varying degrees of interoperability permitted between them. In fact, because deployment of any technology is likely to be gradual, and because any one technology may not be sufficient to provide ubiquitous coverage and continuous high quality of service, even a single wireless operator may deploy different RATs in any given area, with overlapping coverage.

Thus, at any given time and location, multiple different RATs may be accessible to a wireless communication device or other radio node. A multi-RAT radio node supports multiple RATs, and can therefore use any of multiple different RATs for communication. Different RATs, however, may impact power consumption of the radio node to different degrees. Moreover, combined use of multiple RATs, especially at the same time, may dramatically affect the radio's nodes power consumption.

SUMMARY

Embodiments herein include a wireless communication device that comprises different radio access technology (RAT) modules configured to perform functions relating to respective RATs. Notably, though, at least one of the RAT modules is configured to perform a subset of the functions relating to another RAT on behalf of another RAT module, e.g., as part of supporting or serving as a proxy for the other RAT module. In some embodiments, this creates opportunities for the other RAT module to operate in a low-power mode and thereby reduce the device's overall power consumption.

More particularly, embodiments herein include a method performed by a wireless communication device configured for use in a wireless communication system. The method comprises performing, by a first radio access technology, RAT, module of the wireless communication device, functions relating to a first RAT. The method also comprises performing, by a second RAT module of the wireless communication device, functions relating to a second RAT. The method further comprises performing, by the second RAT module, a subset of functions relating to the first RAT on behalf of the first RAT module.

In some embodiments, the method also comprises the first RAT module operating in a low-power mode, a sleep mode, or a disabled mode when the second RAT module handles performance the subset of the functions relating to the first RAT on behalf of the first RAT module. In one such embodiment, the method may further include, responsive to determining that a function relating to the first RAT is to be performed but is not included in the subset of functions that the second RAT module is configured to perform on behalf of the first RAT module, transmitting signaling to the first RAT module that prompts the first RAT module to exit the low-power module, the sleep mode, or the disabled mode.

In some embodiments, the method comprises performing, by the second RAT module, the subset of functions relating to the first RAT on behalf of the first RAT module when one or more defined conditions are met. In one embodiment, for instance, the one or more defined conditions include a remaining battery level of the wireless communication device being below a defined threshold.

Alternatively or additionally, the method comprises performing, by the second RAT module, the subset of functions relating to the first RAT on behalf of the first RAT module when the second RAT module is in an active mode in order to handle performance of at least one function relating to the second RAT.

In some embodiments, the method comprises performing, by the second RAT module, the subset of functions relating to the first RAT on behalf of the first RAT module when the second RAT module is not actively communicating using the second RAT.

In any of the above embodiments, the subset of functions relating to the first RAT may comprise radio resource control, RRC, IDLE mode functions and/or RRC INACTIVE mode functions for the first RAT.

In some embodiments, the subset of functions relating to the first RAT comprises one or more of: receiving system information for the first RAT, performing signal measurements on the first RAT, performing at least a portion of a random access procedure for the first RAT, and performing paging operations for the first RAT.

Alternatively or additionally, in some embodiments, the subset of functions related to the first RAT comprises performing at least a portion of a procedure to setup or resume a radio resource control, RRC, connection on the first RAT.

In some embodiments, the subset of functions relating to the first RAT comprises transmitting or receiving user data via the first RAT when one or more defined conditions are met, wherein the one or more defined conditions include one or more of: an amount of the user data over a defined time period being less than a defined amount threshold; a frequency of transmitting or receiving the user data is less than a defined frequency threshold; and a latency requirement for the user data is more than a first defined latency requirement and/or less than a second defined latency requirement.

In still other embodiments, the subset of functions relating to the first RAT comprise transmitting or receiving information relating to the first RAT, and wherein the method comprising the second RAT module transmitting or receiving the information via a second RAT base station.

In any of the above embodiments, the method may further comprise, by both the first RAT module and the second RAT module, invoking a generic RAT module of the wireless communication device for performing the subset of functions relating to the first RAT radio, wherein the generic RAT module is configured to perform the subset of functions for both the first RAT and the second RAT.

Note that in some embodiments the first RAT module and the second RAT module share the same, or have in common the same type of, one or more of: radio frequency circuitry, sampling circuitry, Fourier transform circuitry, and synchronization signal detection circuitry.

In one embodiment, the first RAT is New Radio and the second RAT is Long Term Evolution, or the first RAT is Long Term Evolution and the second RAT is New Radio.

In some embodiments, the first RAT module comprises a first RAT chipset and the second RAT module comprises a second RAT chipset. Alternatively, in other embodiments, the first RAT module and the second RAT module are each hosted on a shared chipset.

In general, in some embodiments, the first RAT module and the second RAT module each comprise or are hosted on circuitry.

In one embodiment, the wireless communication device is a user equipment.

Embodiments herein also include a wireless communication device configured for use in a wireless communication system, the wireless communication device. The wireless communication device comprises a first radio access technology, RAT, module configured to perform functions relating to a first RAT. The device also comprises a second RAT module configured to perform functions relating to a second RAT and perform a subset of the functions relating to the first RAT on behalf of the first RAT module.

Embodiments herein further include a wireless communication device configured for use in a wireless communication system. The wireless communication device comprises processing circuitry and memory. The memory contains instructions executable by the processing circuitry wherein the wireless communication device is configured to implement a first radio access technology, RAT, module configured to perform functions relating to a first RAT and a second RAT module configured to perform functions relating to a second RAT and perform a subset of the functions relating to the first RAT on behalf of the first RAT module.

Embodiments herein further include a method performed by a second radio access technology, RAT, module configured for use in a wireless communication device that includes a first RAT module for performing functions related to a first RAT. The method comprises performing functions relating to a second RAT, and performing a subset of the functions relating to the first RAT on behalf of the first RAT module.

Embodiments additionally include a second radio access technology, RAT, module configured for use in a wireless communication device that includes a first RAT module for performing functions related to a first RAT. The second RAT module is configured to perform functions relating to a second RAT, and perform a subset of the functions relating to the first RAT on behalf of the first RAT module.

Other embodiments include a method performed by a second radio access technology (RAT) radio network node configured for use in a wireless communication system. The method comprises forwarding information relating to a first RAT between a first RAT radio network node and a second RAT module of a wireless communication device. In this regard, the second RAT module is configured to perform functions relating to the second RAT and to perform a subset of functions relating to the first RAT, wherein the subset of functions included transmitting or receiving the information relating to the first RAT on behalf of a first RAT module of the wireless communication device.

Embodiments further include a second radio access technology (RAT) radio network node configured for use in a wireless communication system. The second RAT radio network node is configured to forward information relating to a first RAT between a first RAT radio network node and a second RAT module of a wireless communication device. In this regard, the second RAT module is configured to perform functions relating to the second RAT and to perform a subset of functions relating to the first RAT, wherein the subset of functions included transmitting or receiving the information relating to the first RAT on behalf of a first RAT module of the wireless communication device.

Embodiments also include corresponding computer programs and carriers such as non-transitory computer readable storage mediums.

BRIEF DESCRIPTION OF THE DRAWINGS

FIG. 6 is a logic flow diagram of a method performed by a wireless communication device according to some embodiments.

FIG. 7 is a logic flow diagram of a method performed by a second RAT module of a wireless communication device according to some embodiments.

FIG. 8 is a logic flow diagram of a method performed by a radio network node according to some embodiments.

DETAILED DESCRIPTION

Figure 1:
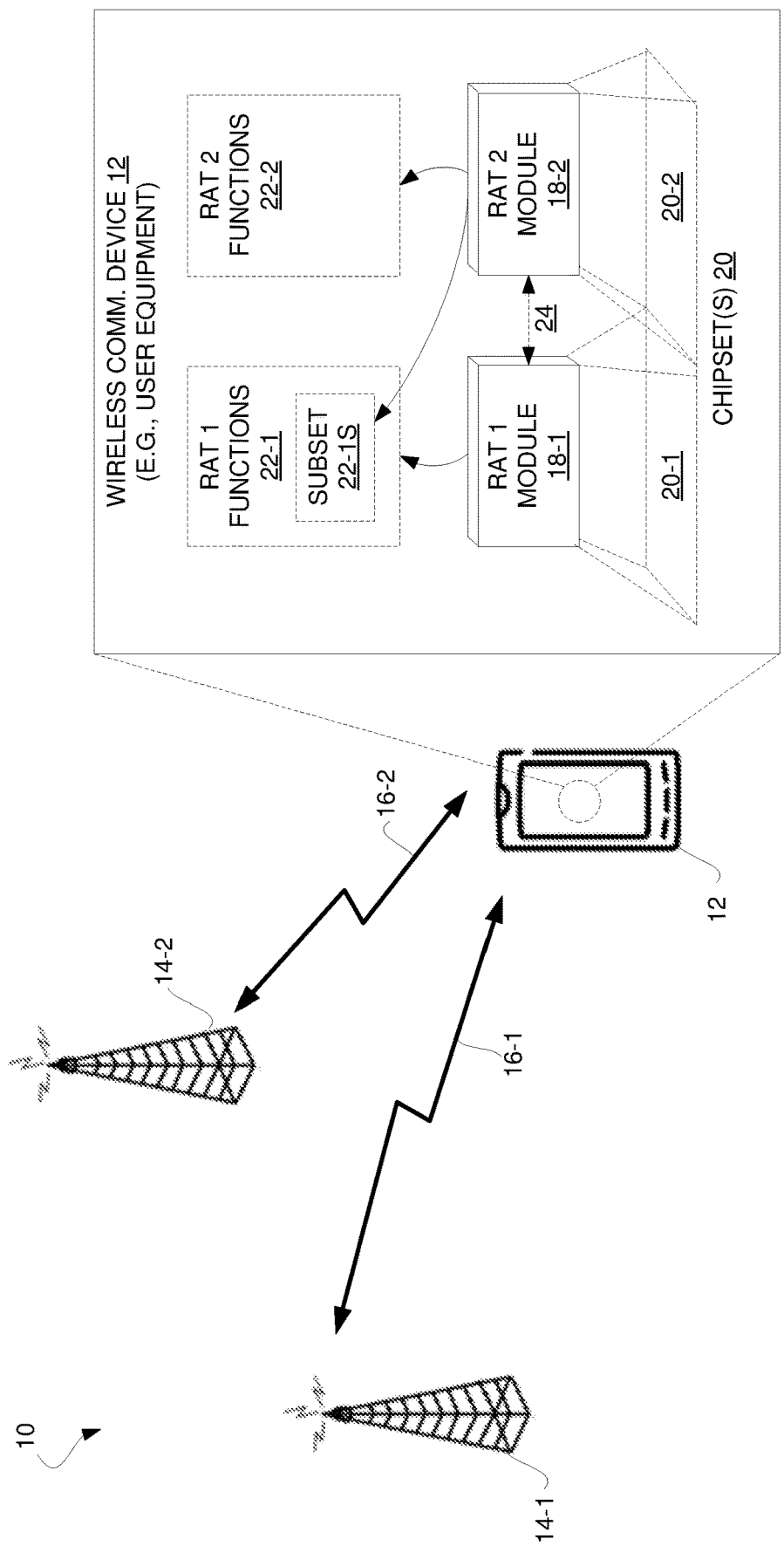
FIG. 1 is a block diagram of a wireless communication system with a wireless communication device and radio network node according to some embodiments.

FIG. 1 shows a wireless communication system 10 according to some embodiments. The system 10 includes a wireless communication device 12 (e.g., a user equipment) that supports multiple radio access technologies (RATs), such as Long Term Evolution (LTE) and New Radio (NR). FIG. 1 for instance shows that the wireless communication device 12 is configured to communicate with a first radio network node 14-1 using a first RAT 16-1 and to communicate with a second radio network node 14-2 using a second RAT 16-2, where the first and second radio network nodes may or may not be co-located.

The wireless communication device 12 in this regard includes a first RAT module 18-1 and a second RAT module 18-2. The first and second RAT modules 18-1, 18-2 in some embodiments may comprise or be hosted on respective first and second chipsets 20-1, 20-2, or in other embodiments may be hosted on a single shared chipset 20. Regardless, the first RAT module 18-1 is configured to perform functions 22-1 relating to the first RAT 16-1. Such functions may relate to the first RAT 16-1 in the sense that they govern, control, or otherwise support communication via the first RAT 16-1. The functions may include for instance (i) receiving from the first radio network node 14-1 system information for the first RAT 16-1 that indicates parameters for communicating via the first RAT 16-1; (ii) performing initial (e.g., random) access and/or search procedures for the first RAT 16-1 in order to detect and connect to the first radio network node 14-1 using the first RAT 16-1, such as by performing a procedure to setup or resume a radio resource control (RRC) connection on the first RAT 16-1; (iii) performing signal measurements for the first RAT 16-1, including for instance mobility measurements for the first RAT 16-1; (iv) performing paging operations for the first RAT 16-1, e.g., in order to establish a device-terminated call or session via the first RAT 16-1; and (iv) transmitting or receiving control signaling and/or user data via the first RAT 16-1. As these examples demonstrate, at least some of the functions 22-1 relating to the first RAT 16-1 in some embodiments include RRC idle mode functions and/or RRC inactive mode functions for the first RAT 16-1.

The first RAT module 18-1 may in fact be configured to only perform the functions 22-1 that relate to the first RAT 16-1; the first RAT module 18-1 may not be capable of or configured to perform any functions that relate to the second RAT 16-2.

The wireless communication device 12 in this regard includes the second RAT module 18-2 for performing functions 22-2 relating to the second RAT 16-2. Such functions may similarly relate to the second RAT 16-2 in the sense that they govern, control, or otherwise support communication via the second RAT 16-2. In some embodiments, at least some of the functions may be similar to those listed for the first RAT 16-1 above (e.g., receiving system information, performing initial access and/or searching procedures, performing signal measurements, etc.), but be related to the second RAT 16-2.

Notably, the second RAT module 18-2 is also configured to perform a subset 22-1S of the functions 22-1 relating to the first RAT 16-1, e.g., RRC idle mode functions. That is, in at least some embodiments, both the first RAT module 18-1 and the second RAT module 18-2 are configured to perform this subset 22-1A of functions 22-1 relating to the first RAT 16-1, e.g., such that the wireless communication device 12 duplicates the capability for performing any function in this subset 22-1S across the first and second RAT modules 18-1, 18-2. When the second RAT module 18-2 performs the subset 22-1S of functions 22-1 relating to the first RAT 16-1, though, the second RAT module 18-2 does so on behalf of the first RAT module 18-1. The second RAT module 18-2 may for instance be configured to perform this subset 22-1S of functions 22-1 as part of supporting, or serving as a proxy for, the first RAT module 18-1. The second RAT module 18-2 in some embodiments may thereby perform any function in the subset 22-1S instead of or in cooperation with the first RAT module 18-1.

The second RAT module's ability to perform any function in the subset 22-1S on behalf of the first RAT module 18-1 means that in some embodiments coordination occurs regarding which RAT module(s) 18-1, 18-2 perform a function in the subset 22-1S, e.g., at any given time and/or for any given purpose. Such coordination may occur on a dynamic, as-needed basis or by embodied in a predefined schedule that governs the times at which each RAT module handles performance of the subset 22-1S of functions. Moreover, coordination may take place directly between the RAT modules themselves (e.g., as direct inter-module cooperation 24), or may be governed, controlled, or otherwise facilitated via a separate controller or control module (not shown).

Figure 2:
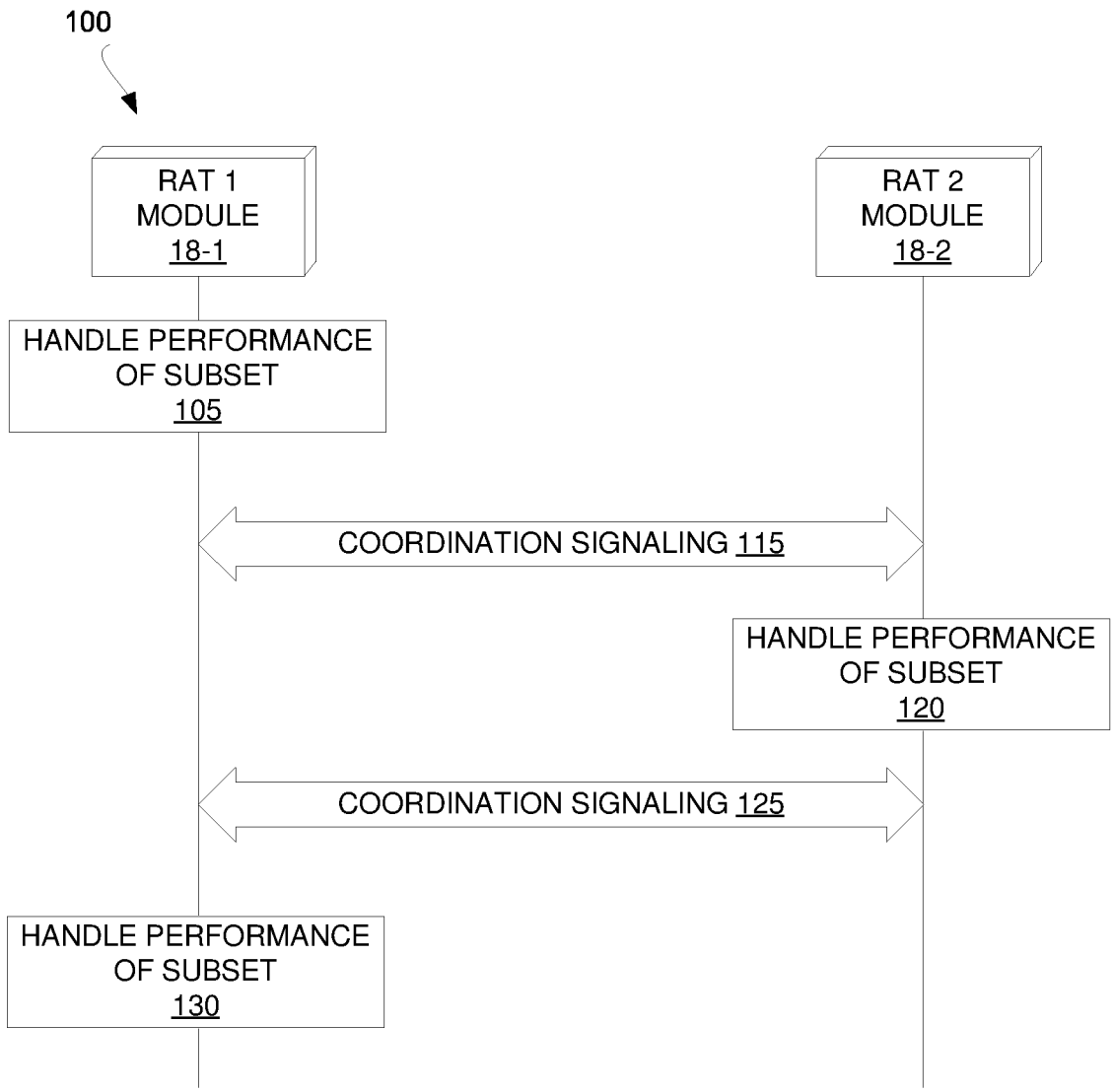
FIG. 2 is a call flow diagram between first and second radio access technology (RAT) modules of a wireless communication device according to some embodiments.

FIG. 2, for example, illustrates some embodiments involving direct coordination between the RAT modules 18-1, 18-2. As shown in FIG. 2, the first RAT module 18-1 initially handles performance of the subset 22-1S of functions (Block 105), in the sense that the first RAT module 18-1 remains responsible for performing any function in the subset 22-1S if and when needed. Under one or more defined conditions, or according to a defined schedule, though, the first and second RAT modules 18-1, 18-2 engage in signaling 115 for coordinating which module is to handle performance of the subset 22-1S. In some embodiments, this coordination signaling 115 is initiated by the first RAT module 18-1, whereas in other embodiments the coordination signaling 116 is initiated by the second RAT module 18-2. Moreover, the coordination signaling 116 may involve only one-way communication (e.g., in the form of a one-way notification or command) or may involve two-way communication (e.g., as part of a negotiation). Regardless, as a result of coordination signaling 115 in this example, the second RAT module 18-2 takes over handling performance of the subset 22-1S of RAT 1 functions (Block 120). Later, the first and second RAT modules 18-1, 18-2 again engage in coordination signaling 125 resulting in the first RAT module 18-1 taking back over handling performance of the subset 22-1S of RAT 1 functions (Block 130).

No matter the particular way inter-module coordination is implemented, such coordination in some embodiments facilitates power efficiency of the wireless communication device 12. In one or more embodiments, for example, the second RAT module 18-2 is inherently better optimized for performing the subset 20-1S of functions 20-1 as compared to the first RAT module 18-1, e.g., optimized processing efficiency may yield better energy efficiency. In this case, then, power efficiency improvements may be realized any time the second RAT module 18-2 handles performance of the subset 22-1S of RAT 1 functions, instead of or in conjunction with the first RAT module 18-1. Alternatively or additionally, coordination may offload performance of the subset 20-1S of first RAT functions onto the second RAT module 18-2 in a way or to an extent that creates opportunities for the first RAT module 18-1 to operate in a low-power mode, sleep mode, or disabled mode and correspondingly reduce the device's overall power consumption.

Figure 3:
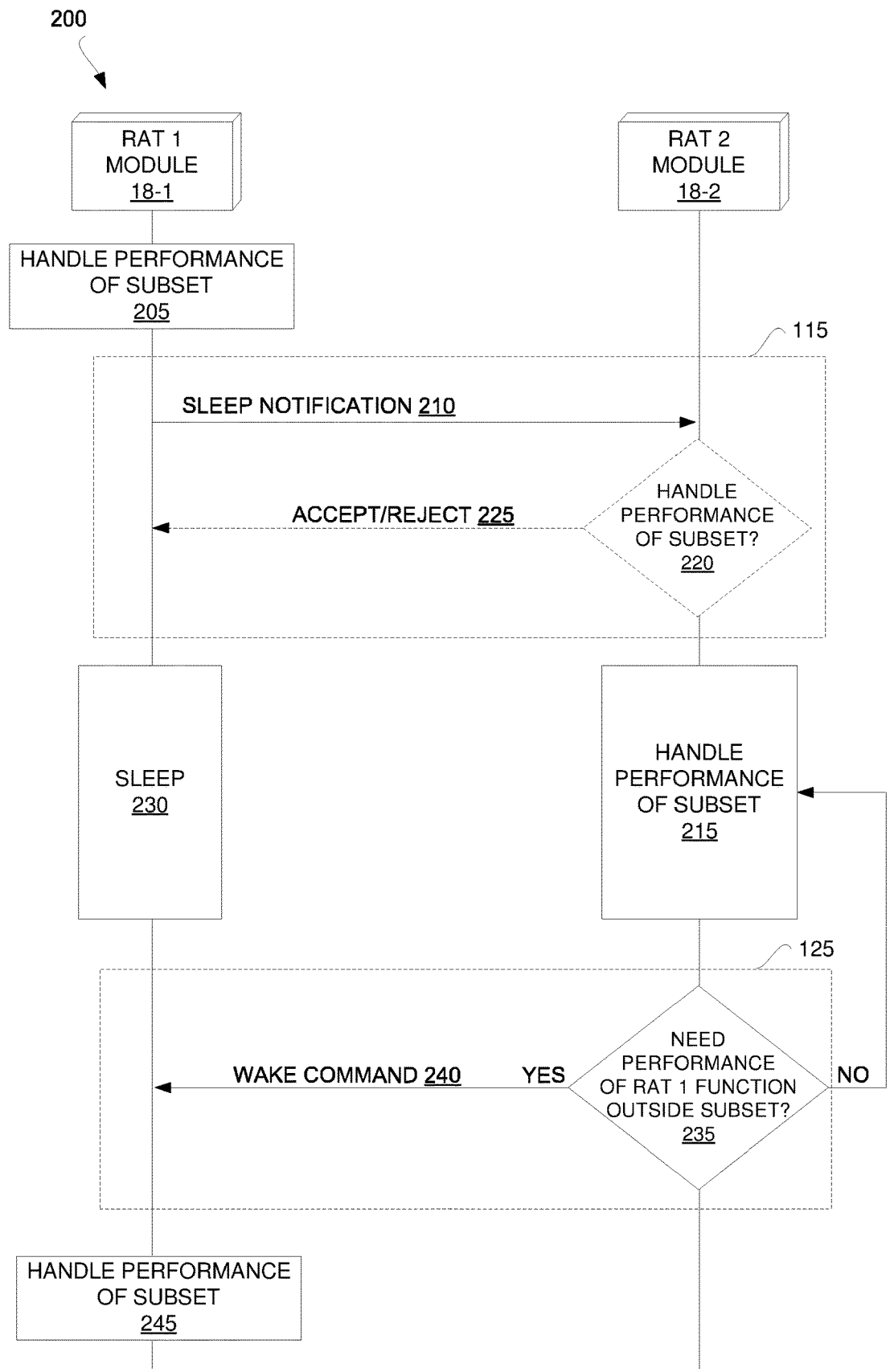
FIG. 3 is a call flow diagram between first and second radio access technology (RAT) modules of a wireless communication device according to other embodiments.

Consider for instance the example shown in FIG. 3 whereby the first RAT module 18-1 operates in a sleep mode when the second RAT module 18-2 handles performance of the subset 22-1S of RAT 1 functions on behalf of the first RAT module 18-1. As shown, the first RAT module 18-1 initially handles performance of the subset 22-1S of functions (Block 205), in the sense that the first RAT module 18-1 remains responsible for performing any function in the subset 22-1S if and when needed. In this example, the first RAT module 18-1 initiates coordination signaling 115 in the form of a sleep notification 210 that notifies the second RAT module 18-2 that the first RAT module 18-1 is or is going to transition to operating in the sleep mode. In some embodiments, for example, when no first RAT function outside the subset 22-1S needs to be performed currently (or within a defined amount of time), the first RAT module 18-1 may seek to transition to operating in a sleep mode, in favor of the second RAT module 18-2 handling performance of the subset 20-1S of functions 20-1 if and when needed. Where the subset 22-1S includes RRC idle mode functions, for instance, the first RAT module 18-1 may seek to transition to operating in the sleep mode when an RRC connection on the first RAT 16-1 goes into idle mode.

In response to the sleep notification 210, the second RAT module 18-2 as shown takes over handling performance of the subset 22-1S of RAT 1 functions (Block 215). The second RAT module 18-2 in some embodiments is configured to do so unconditionally. In other embodiments, though, the second RAT module 18-2 conditions taking over performance of the subset 22-1S of RAT 1 functions on one or more conditions being met. As shown, for instance, the second RAT module 18-2 determines whether to handle performance of the subset 22-1S of RAT 1 functions based on whether the condition(s) are met (Block 220) and transmits a response 225 to the RAT 1 module 18-1 that indicates whether the second RAT module 18-2 accepts or rejects responsibility for performing the subset 22-1S of RAT 1 functions. In some embodiments, the condition(s) include the second RAT module 18-2 being in an active (i.e., non-sleep) mode itself in order to handle performance of at least one function relating to the second RAT 16-2. That is, when such a condition is met, the second RAT module 18-2 would have been awake anyway in order to perform a RAT 2 function, irrespective of whether the second RAT module 18-2 is responsible for performing the subset 22-1S of RAT 1 functions. Taking over responsibility for the subset 22-1S of RAT 1 functions therefore does not prevent the second RAT module 18-2 itself from operating in a sleep mode in this case. Alternatively or additionally, the condition(s) may include the second RAT module 18-2 not being preoccupied with certain (prioritized) functions relating to the second RAT 16-2. Such function may include for instance the second RAT module 18-2 actively communicating using the second RAT 16-2 (e.g., during the middle of a user data transmission). In one embodiment, therefore, the condition (s) may include the second RAT module 18-2 being in a discontinuous reception (DRX) OFF cycle in which it is not required to monitor the control or paging channel of the second RAT 16-2.

No matter the condition or unconditional nature of the second RAT module's taking on performance of the subset 22-1S, the first RAT module 18-1 in FIG. 3 operates in the sleep mode (Block 230) when the second RAT module 18-2 handles performance of the subset 22-1S (Block 215). In the sleep mode, the first RAT module 18-1 may inactivate or reduce certain communication and/or processing resources (e.g., receiver circuitry) configured to perform all or part of the functions 22-1 related to the first RAT 16-1. This may in turn reduce power consumption attributable to the first RAT module 18-1. Different sleep modes or degrees of low-power operation may be used in some embodiments, e.g., to offer different tradeoffs between power efficiency and wake-up speed. In some embodiments, in the sleep mode, the first RAT module 18-1 may be incapable of performing not only the subset 22-1S of functions but also any function outside that subset 22-1 related to the first RAT.

Accordingly, in some embodiments, when a function relating to the first RAT 16-1 is to be performed but is not included in the subset 20-1S of functions that the second RAT module 18-2 is configured to perform on behalf of the first RAT module 18-1, the first RAT module 18-1 may awake to perform that function, e.g., in response to an wake signal. As shown in FIG. 3, for instance, the second RAT module 18-2 handles performance of the subset 22-1S of RAT 1 functions but meanwhile monitors for whether a function relating to the first RAT 16-1 is to be performed but is not included in the subset 22-1S of functions that the second RAT module 18-2 is configured to perform on behalf of the first RAT module 18-1 (Block 235). When such performance is needed (YES at Block 235), the second RAT module 18-2 implements coordination signaling 125 in the form of signaling (e.g., a wake request or command 240) that prompts the first RAT module 18-1 to exist the sleep mode. Indeed, in response to the wake command 240 in FIG. 3, the first RAT module 18-1 transitions from the sleep mode to an awake mode so as to handle performance of any function relating to the first RAT 16-1. In some embodiments, for example, this means that the first RAT module 18-1 resumes responsibility for handling performance of the subset 22-1S of RAT 1 functions (Block 245). In some embodiments, the second RAT module 18-2 transfers its state (resulting from having performed the subset 22-1S of functions) to the first RAT module 18-1, so that the first RAT module 18-1 may (seamlessly) continue performing those or other functions relating to the first RAT 16-1 using the transferred state.

Note that the subset 22-1S of functions relating to the first RAT 16-1 may include any portion of the functions 22-1 that the first RAT module 18-1 is configured to perform for the first RAT 16-1, but not all of those functions 22-1. In some embodiments, for example, the subset 22-1S of functions relating to the first RAT 16-1 is limited to one or more of: receiving system information for the first RAT 16-1 (e.g., on a broadcast channel), receiving synchronization signals for the first RAT 16-1 (e.g., primary and secondary synchronization signals for time and frequency synchronization), performing signal measurements (e.g., mobility measurements) on the first RAT 16-1, and monitoring for and/or receiving paging messages on the first RAT 16-1. In these and other embodiments, then, the subset 22-1S may be limited to functions that the second RAT module 18-2 is able to perform on its own without transmitting towards the network.

In other embodiments, the subset 22-1S of functions relating to the first RAT 16-1 is alternatively or additionally limited to one or more of: performing at least a portion of a random access procedure for the first RAT 16-1 (e.g., transmitting a random access preamble and/or a contention resolution message), performing paging operations for the first RAT 16-1 (e.g., receiving a page and/or transmitting a page response), and performing at least a portion of a procedure to setup or resume an RRC connection on the first RAT 16-1. In these and other embodiments, then, the subset 22-1S may include at least some functions that the second RAT module 18-2 performs by transmitting towards the network on behalf of the first RAT module 18-1.

Consider for instance embodiments concerning a random access procedure and/or a procedure for setting up or resuming an RRC connection on the first RAT 16-1. In this regard, when the first RAT module 18-1 has an RRC connection established with the first radio access node 14-1, the first RAT module 18-1 operates in an RRC CONNECTED state. During this state, the first RAT module 18-1 performs operations such as monitoring for scheduling grants, performing user data transmissions, and the like. When the first RAT module 18-1 does not have an RRC connection established with the first radio network node 14-1, the first RAT module 18-1 operates in an RRC IDLE state. In this state, the first RAT module 18-1 may perform operations such as receiving broadcast data, monitoring a paging channel, and performing neighbor cell measurements. This requires the first RAT module 18-1 to be awake and active for only short time periods. The lower activity in the RRC IDLE state means lower power consumption for the first RAT module 18-1 and the device 12 as a whole. To conserve battery life, the first RAT module 18-1 may transition to the RRC IDLE state once an inactivity timer expires.

In some embodiments, another RRC state referred to as RRC INACTIVE or RRC SUSPENDED is defined as an intermediate state between RRC CONNECTED and RRC IDLE states, e.g., whereby the RRC connection is viewed as inactive or suspended. In this intermediate state, the first RAT module 18-1 is perceived as being in the RRC CONNECTED state from a core network point of view, but is perceived as being in the RRC IDLE state from a radio access network point of view. This allows for reduced signaling towards the core network for transition to RRC CONNECTED state, while maintaining the power savings advantages of RRC IDLE state. To transition from RRC IDLE to RRC CONNECTED, the first RAT module 18-1 sends an RRC Connection Setup Request message to the first radio network node 14-1 and receives an RRC Connection Setup command in response. To transition from RRC INACTIVE or RRC SUSPENDED to RRC CONNECTED, so as to "resume" the previous RRC connection, the first RAT module 18-1 sends an RRC Connection Resume Request message to the first radio network node 14-1 and receives an RRC Connection Resume command in response.

Figure 4A:
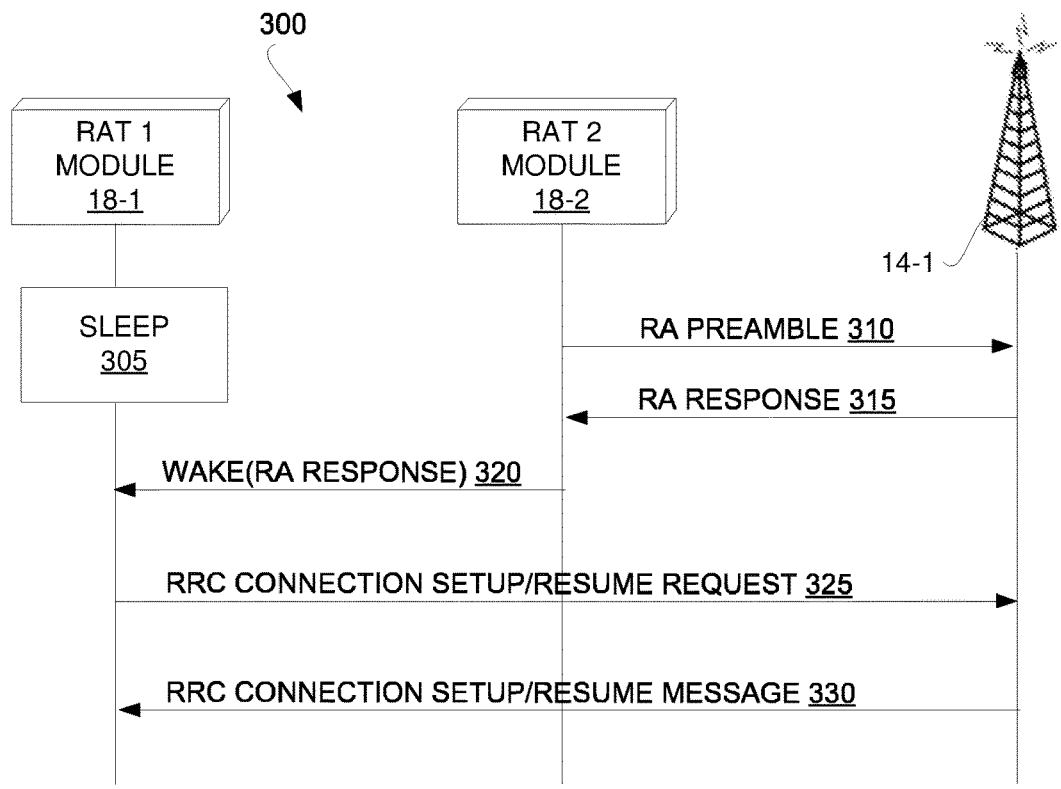
FIG. 4A is a call flow diagram between first and second ART modules and a radio network node according to some embodiments.
Figure 4B:
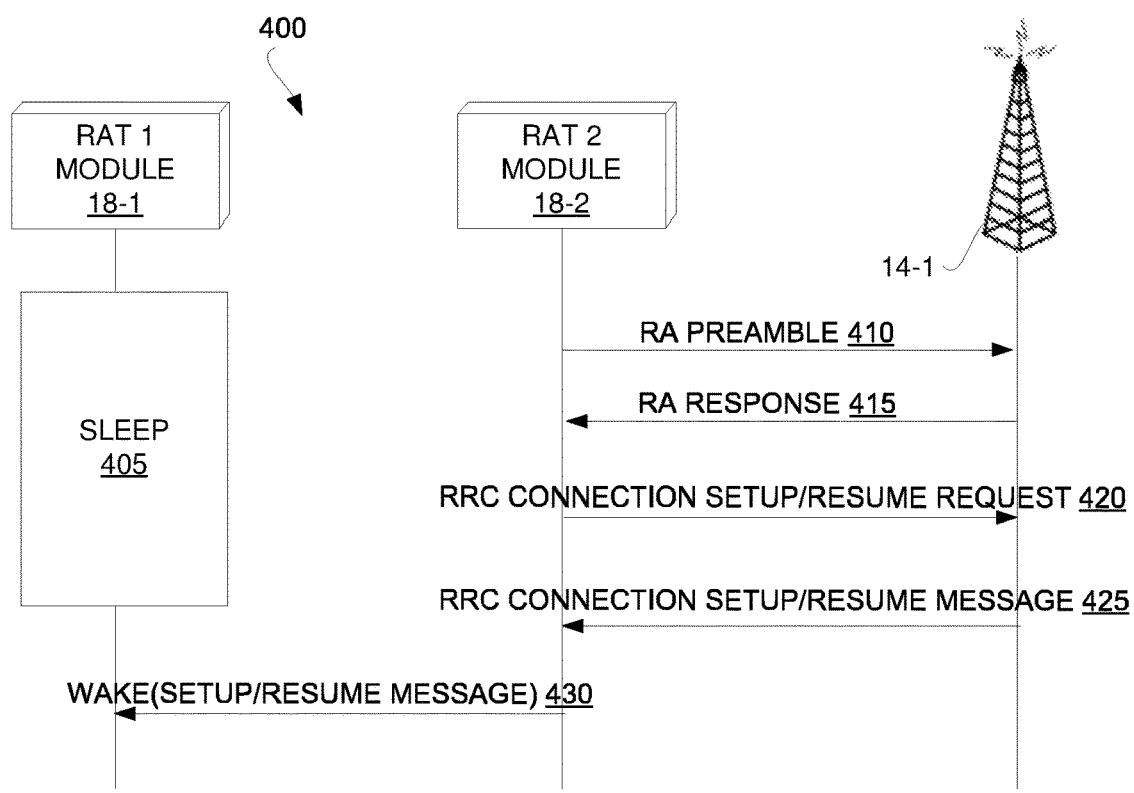
FIG. 4B is a call flow diagram between first and second ART modules and a radio network node according to other embodiments.
Figure 4C:
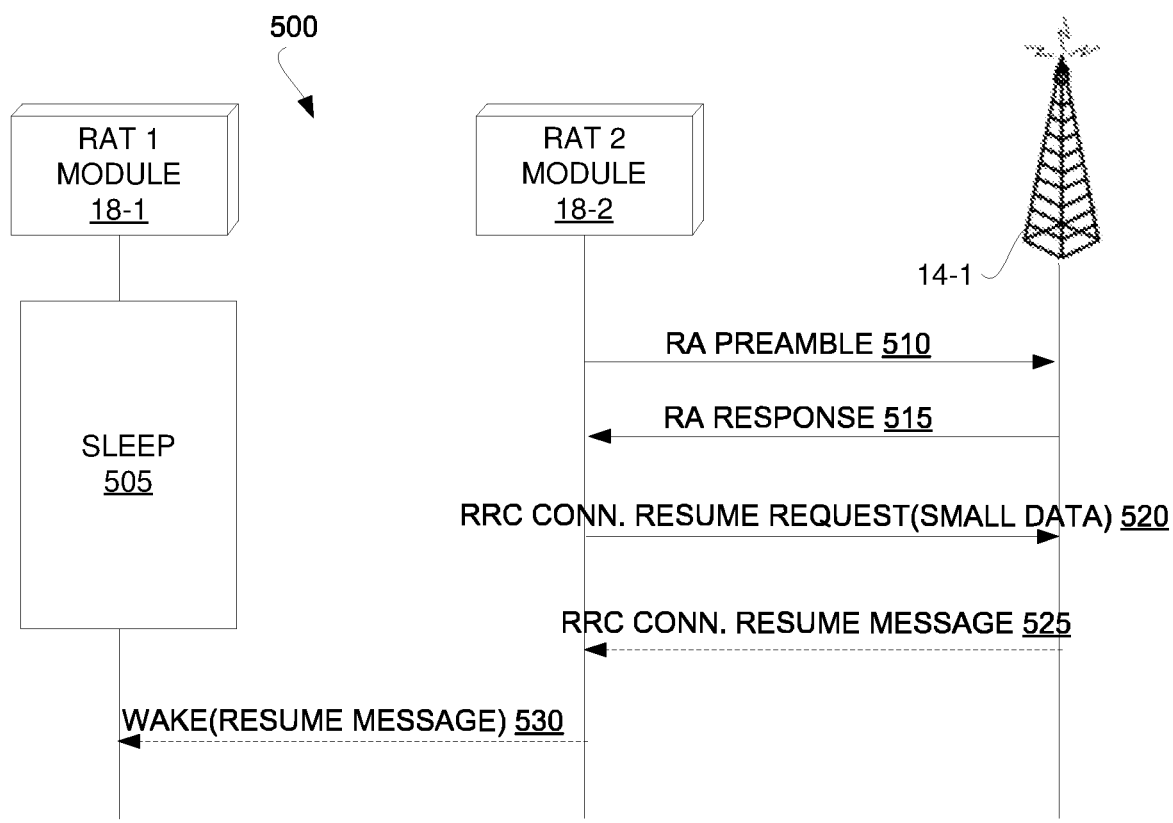
FIG. 4C is a call flow diagram between first and second ART modules and a radio network node according to still other embodiments.
Figure 5:
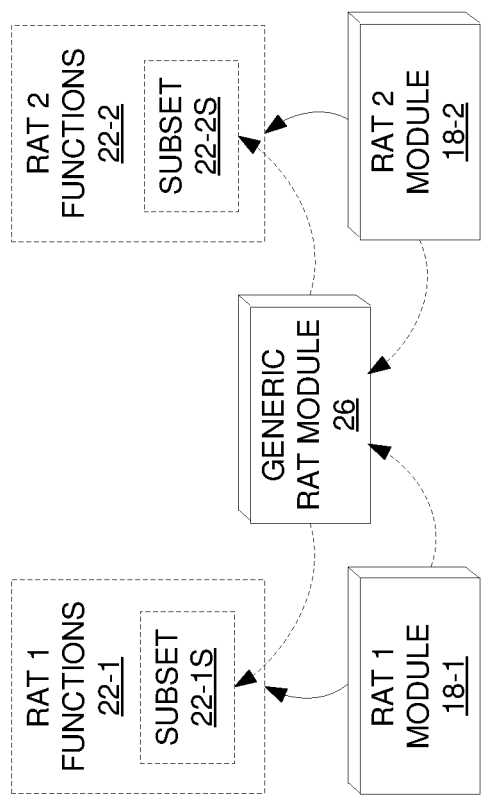
FIG. 5 is a block diagram of RAT modules and a generic RAT module of a wireless communication device according to some embodiments.

FIGS. 4A-4C illustrate embodiments where the second RAT module 18-2 may perform, on behalf of the first RAT module 18-1, at least a portion of a random access procedure and/or a procedure for setting up or resuming an RRC connection on the first RAT 16-1. As shown in FIG. 4A, the second RAT module 18-2 transmits a random access (RA) preamble 310 to the first radio access node 14-1 on behalf of the first RAT module 18-1. The second RAT module 18-2 also monitors for a RA response 315 from the first radio access node 14-1. Meanwhile, the first RAT module 18-1 operates in the sleep mode 305. Responsive to receiving the monitored-for RA response 315, the second RAT module 18-2 transmits a wake signal 320 to the first RAT module 18-1, optionally also by passing the first RAT module 18-1 the received random access response. The first RAT module 18-1 may then proceed with the remainder of the random access procedure, by transmitting an RRC connection setup or resume request 325 and receiving a corresponding RRC connection setup or resume (command) message 330. This approach allows the first RAT module 18-1 to remain in sleep mode until a response to the RA preamble is successfully received.

FIG. 4B shows an example where the second RAT module 18-2 performs even more of the random access procedure on behalf of the first RAT module 18-1, waking the first RAT module 18-1 only after it receives the RRC connection setup or resume command from the first radio access node 14-1. In particular, as shown, the second RAT module 18-2 transmits a random access (RA) preamble 410 to the first radio access node 14-1 on behalf of the first RAT module 18-1. The second RAT module 18-2 also monitors for a RA response 415 from the first radio access node 14-1. Meanwhile, the first RAT module 18-1 operates in the sleep mode 405. Responsive to receiving the monitored-for RA response 415, rather the second RAT module 18-2 transmitting a wake signal to the first RAT module 18-1 as in FIG. 4A, the second RAT module 18-2 itself proceeds with the remainder of the random access procedure, by transmitting an RRC connection setup or resume request 420 and receiving a corresponding RRC connection setup or resume (command) message 425 on behalf of the first RAT module 18-1. Once the RRC connection setup or resume (command) message 425 is received, the second RAT module 18-2 transmits the wake signal 430 to the first RAT module 18-1.

Consider one embodiment, for instance, where the first RAT 16-1 is LTE and the second RAT 16-2 is NR. When uplink data arrives at the device 12 that belongs to a bearer, service, or application mapped to LTE, the second RAT module 18-2 sends RA preamble 410 and RRC connection setup or resume request 420 to the first radio network node 14-1 (e.g., LTE base station) on behalf of the first RAT module 18-1. From the point of view of the first radio network node 14-1, these messages in some embodiments are indistinguishable from messages that are actually sent from the first RAT module 18-1.

In still other embodiments, the second RAT module 18-2 alternatively or additionally transmits or receives user data via the first RAT 16-1, at least when one or more defined conditions are met. The conditions may include for instance one or more of: an amount of the user data over a defined time period being less than a defined amount threshold (e.g., "small" data amounts); a frequency of transmitting or receiving the user data is less than a defined frequency threshold; and a latency requirement for the user data is more than a first defined latency requirement and/or less than a second defined latency requirement. FIG. 4C shows one example of this.

As shown in FIG. 4C, the second RAT module 18-2 performs a "small" uplink data transmission on behalf of the first RAT module 18-1 without necessarily performing a full state transition to RRC CONNECTED (assuming a 4-step random access procedure). If the radio network node 14-1 decides that transition to RRC CONNECTED should occur, the second RAT module 18-2 may receive the RRC connection resume message 525 on behalf of the first RAT module 18-1, and thereafter transmit the wake signal 530 to the first RAT module 18-1. Otherwise, if no transition to RRC CONNECTED is to occur, the first RAT module 18-1 may remain in the sleep mode 505.

Although some of the above examples were illustrated for uplink, similar embodiments may be implemented for the downlink. For example, the second RAT module 18-2 may listen to a paging channel of the first RAT 16-1 on behalf of the first RAT module 18-1 and receive user data on behalf of the first RAT module 18-1, e.g., under one or more defined conditions.

Note, too, that although the above examples were illustrated with the second RAT module 18-2 communicating with the first radio network node 14-1 directly, in other embodiments the second RAT module 18-2 may transmit or receive information relating to the first RAT 16-1 via the second radio network node 14-2 (e.g., the second RAT base station). The information may be transmitted via the second radio network node 14-2 in this way, for instance, using a container or tunnel between the second RAT module 18-2 and the first radio network node 14-1. Where the first RAT 16-1 is LTE and the second RAT 16-2 is NR, for example, the second RAT module 18-2 may send an RRC Resume Request message towards the second radio network node 14-2 as an NR base station. The second radio network node 14-2 may then forward the message to the first radio network node 14-1 as an LTE base station. Correspondingly, the first radio network node 14-1 may transmit the response towards the second radio network nod 14-2, which in turn forwards the response to the second RAT module 18-2. The second RAT module 18-2 may then wake up the first RAT module 18-1.

Regardless of the particular implementation, though, the above embodiments demonstrate that the subset 22-1S of RAT 1 functions that the second RAT module 18-2 is configured to perform on behalf of the first RAT module 18-1 may include RRC IDLE mode functions and/or RRC INACTIVE mode functions. In fact, in some embodiments, this subset 22-1S of RAT 1 functions is strictly limited to RRC IDLE mode functions and/or RRC INACTIVE mode functions, e.g., in the sense that the subset 22-1A excludes any functions in the RRC CONNECTED mode such that the first RAT module 18-1 always handles performance of those functions.

No matter the particular functions, though, the subset 22-1S in some embodiments may be defined so as to effectively exploit commonalities that the first and second RATs 16-1, 16-2 have in terms of underlying signal structure, frequency band, hardware (e.g., circuitry), processing, or other characteristics. For example, in some embodiments, these RAT commonalities are such that the first and second RAT modules 18-1, 18-2 share the same, or have in common the same type of, certain underlying hardware (e.g., circuitry), including one or more of: radio frequency (RF) circuitry, sampling circuitry, Fourier transform circuitry, and synchronization signal detection circuitry (e.g., hardware accelerator). This may be the case for instance where the first RAT 16-1 is LTE and the second RAT 16-2 is NR, or vice versa, as LTE and NR are both based on Orthogonal Frequency Division Multiplexing (OFDM) and/or the same frequency band so as to share commonalities in terms of signal acquisition and transmission. In some embodiments, for example, the subset 22-1S may include receiver functionality required for cell detection, quality estimation, or any idle mode or radio resource management (RRM) operation. Regardless, with the RAT modules 18-1, 18-2 sharing the same, or having the same type of, certain hardware, some embodiments define the subset 22-1S of RAT 1 functions as including those RAT 1 functions which are implemented on that certain hardware, e.g., potentially with modified software, such as for cell detection, reference signal received power (RSRP) estimation, measurement reporting, etc. With the subset 22-1S defined in this way, the total activated hardware or circuitry is reduced.

In view of this, some embodiments herein exploit a generic RAT module that is able to fully or partially carry out at least some functions related to both RATs, e.g., with different software for different RATs. FIG. 6 shows one such embodiment. As shown, the generic RAT module 26 is able to fully or partially carry out at least some of the subset 22-1S of RAT 1 functions and a corresponding subset 22-2S of RAT 2 functions. Either the first or the second RAT module 18-1, 18-2 may invoke the generic RAT module 26 to carry out such a function. In some embodiments, therefore, the second RAT module 18-2 is configured to perform at least one function in the subset 22-1S of RAT 1 functions by invoking the generic RAT module 26 for carrying out at least a portion of that function with respect to the first RAT 16-1.

In some embodiments, the generic RAT module 26 provides the same functionality no matter the invoking RAT module. For example, in some embodiments, the generic RAT module 26 is able to perform a signal measurement (e.g., for mobility) on both RATs 16-1, 16-2, and may be invoked by either the first or second RAT module 18-1, 18-2 to perform a signal measurement on a particular RAT. The second RAT module 18-2 may for instance invoke the generic RAT module 26 to perform a signal measurement on the first RAT 16-1, or invoke the generic RAT module 26 to perform the same signal measurement on the second RAT 16-2. Such invocation in some embodiments may be by way of a procedure call, e.g., performMeasurement(firstRAT) or performMeasurement(secondRAT).

In other embodiments, though, the generic RAT module 26 may provide different functionality depending on the invoking RAT module. For example, in some embodiments, the generic RAT module 26 performs different types of signal measurements or performs the same signal measurement in different ways depending on whether the invoking module is the first RAT module 18-1 or the second RAT module 18-2. Such distinction may be realized in the procedure call, e.g., performMeasurement(RAT=firstRAT, invoker=secondRAT) or performMeasurement (RAT=secondRAT, invoker=secondRAT).

In at least some embodiments, therefore, not only is the second RAT module 18-2 configured to perform a subset 22-1S of RAT 1 functions, but the first RAT module 18-1 is also configured to perform a subset 22-2S of RAT 2 functions. These subsets may overlap in the type of functions that they include, but differ in how they are implemented.

In one or more embodiments, for instance, differences in waveform numerologies are taken into account when performing functions related to the different RATs. In embodiments where the RATs are NR and LTE, for example, NR is designed for sub-GHz to 100 GHz operations and this difference compared to LTE may be accounted for such as by performing synchronization signal detection with different subcarrier spacing and raster settings.

In view of the above, the first and second RAT modules 18-1, 18-2 herein may each be implemented fully or partially in hardware, e.g., as circuitry, chipset(s), etc. In one embodiment, for instance, the modules 18-1, 18-2 comprise different chips or chipsets, e.g., with (high-level) coordination implemented between them. In other embodiments, the modules 18-1, 18-2 may be implemented on the same die or integrated circuit. In still other embodiments, the modules 18-1, 18-2 are implemented on a single, integrated chip, with hardware shared between the modules 18-1, 18-2. Accordingly, each module 18-1, 18-2 herein may include hardware that is dedicated to that module and/or hardware that is shared with the other module. Alternatively or additionally, the first and second RAT modules 18-1, 18-2 may each be implemented fully or partially in software, e.g., as hosted on shared or dedicated hardware. In these and other embodiments, then, the first and second RAT modules 18-1, 18-2 may be realized at least in part as different software services or software stacks. Broadly, therefore, the first and second RAT modules 18-1, 18-2, herein may comprise or be hosted on circuitry.

In some embodiments, the second RAT module 18-2 performs the subset 22-1S of RAT 1 functions on behalf of the first RAT module 18-1 when one or more defined conditions are met. The one or more conditions may simply include the first RAT module 18-1 being in a sleep mode, as described above. Alternatively or additionally, the one or more conditions may include a remaining battery level of the wireless communication device 12 being below a defined threshold, e.g., so as to exploit the power-saving advantages of some embodiments herein only when needed.

Note that although the above embodiments were illustrated with respect to two RATs and two RAT modules, embodiments herein are extendable to any number of RATs and RAT modules greater than two as well. Further note that although described above with respect to a wireless communication device, some embodiments are extendable to any type of radio node.

In this regard, a radio node herein is any type of node capable of communicating over radio signals. A radio network node herein is any type of network node (e.g., a base station) capable of communicating with another node over radio signals. A wireless communication device 12 is any type device capable of communicating with a radio network node or another wireless communication device over radio signals. A wireless communication device 12 may therefore refer to a machine-to-machine (M2M) device, a machine-type communications (MTC) device, a narrowband internet of things (NB-IoT) device, etc. A wireless communication device 12 may also be referred to as a radio device, a radio communication device, a wireless terminal, or simply a terminal—unless the context indicates otherwise, the use of any of these terms is intended to include device-to-device devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be user equipments, but are generally configured to transmit and/or receive data without direct human interaction.

In an IoT scenario, a wireless communication device 12 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device 12 as described herein may be comprised in a vehicle and may perform monitoring and/or reporting of the vehicle's operational status or other functions associated with the vehicle.

In view of the above modifications and variations, FIG. 6 illustrates a method 600 performed by a wireless communication device 12 according to some embodiments herein. The method 600 includes performing, by a first RAT module 18-1 of the wireless communication device 12, functions 22-1 relating to a first RAT 16-1 (Block 610). The method 600 also include performing, by a second RAT module 18-2 of the wireless communication device 12, functions 22-2 relating to a second RAT 16-2 (Block 620). The method 600 further includes performing, by the second RAT module 18-2, a subset 22-1S of functions 22-1 relating to the first RAT 16-1 on behalf of the first RAT module 18-1 (Block 630).

FIG. 7 correspondingly illustrates a method 700 performed by the second RAT module 18-2 of the wireless communication device 12 according to some embodiments. The method 700 includes performing, by the second RAT module 18-2 of the wireless communication device 12, functions 22-2 relating to a second RAT 16-2 (Block 710). The method 700 further includes performing, by the second RAT module 18-2, a subset 22-1S of functions 22-1 relating to the first RAT 16-1 on behalf of the first RAT module 18-1 (Block 720).

FIG. 8 illustrates a method 800 performed by the second radio network node 14-2 according to still other embodiments. As shown, the method 800 in one or more embodiments includes establishing communication path(s) with the first radio network node 14-1 and with the second RAT module 18-2 of the wireless communication device 12 (Block 810). The established path(s) may include for instance a communication tunnel, e.g., to tunnel RAT 1 information within a RAT 2 tunnel. Regardless, the method 800 as shown comprises forwarding information relating to the first RAT 16-1 between the first RAT radio network node 14-1 and the second RAT module 18-2 of the wireless communication device 12 (Block 820).

The wireless communication device 12 as described above may perform the method in FIG. 6 and any other processing herein by implementing any functional means or units. In one embodiment, for example, the wireless communication device 12 comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 9:
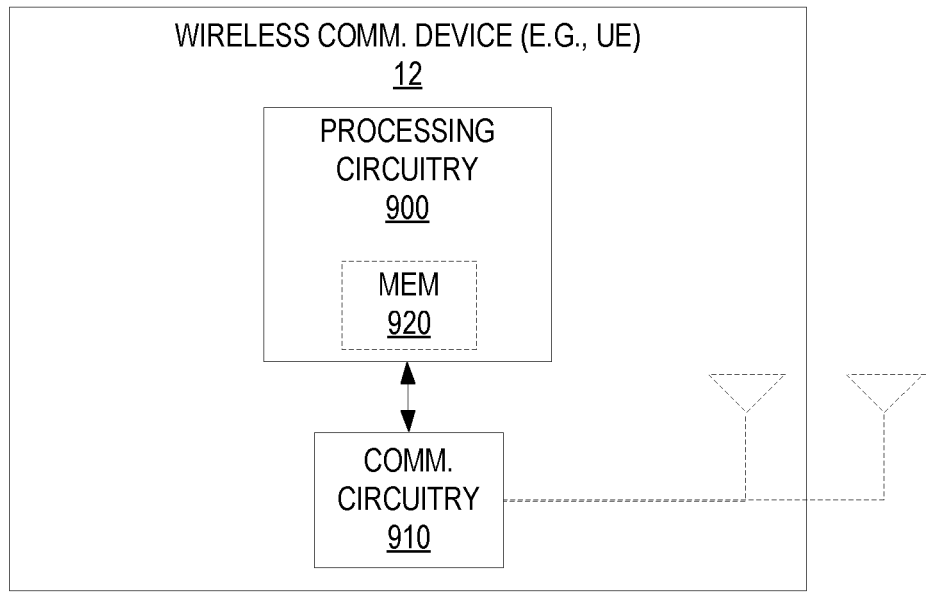
FIG. 9 is a block diagram of a wireless communication device according to some embodiments.

FIG. 9 illustrates a wireless communication device 12 implemented in accordance with one or more embodiments. As shown, the wireless communication device 12 includes processing circuitry 900 and communication circuitry 910. The communication circuitry 910 is configured to transmit and/or receive information to and/or from one or more other nodes, e.g., via any communication technology. Such communication may occur via one or more antennas that are either internal or external to the wireless communication device 12. The processing circuitry 900 is configured to perform processing described above, e.g., in FIG. 6, such as by executing instructions stored in memory 920. The processing circuitry 900 in this regard may implement certain functional means or units for realizing the first and second RAT modules 18-1, 18-2 described above.

Figure 10:
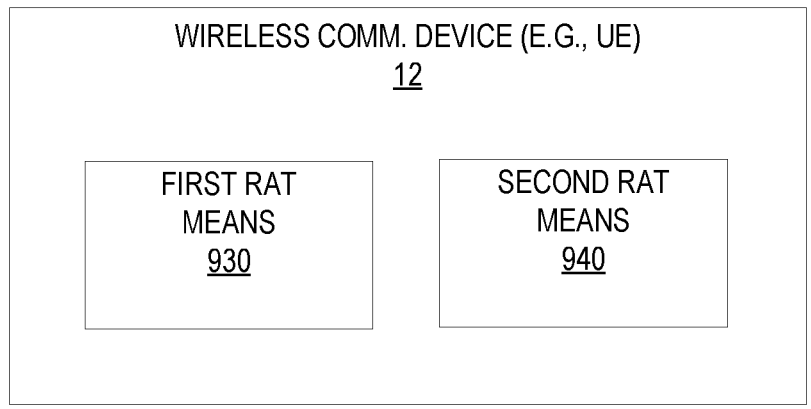
FIG. 10 is a block diagram of a wireless communication device according to other embodiments.

FIG. 10 illustrates a wireless communication device 12 implemented in accordance with one or more other embodiments. As shown, the wireless communication device 12 implements various functional means (or units), e.g., via the processing circuitry 900 in FIG. 9 and/or via software code. These functional means, e.g., for implementing the method in FIG. 6, include for instance first RAT means 930 for implementing the first RAT module 18-1 and second RAT means 940 for implementing the second RAT module 18-2.

Similarly, the second radio network node 14-2 as described above may perform the method in FIG. 8 and any other processing herein by implementing any functional means or units. In one embodiment, for example, the second radio network node 14-2 comprises respective circuits or circuitry configured to perform the steps shown in FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 11:
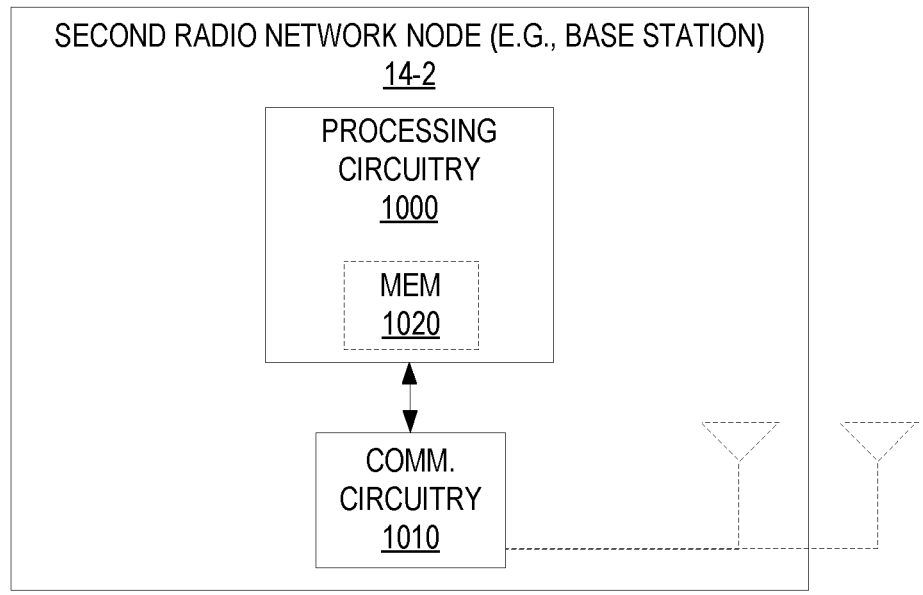
FIG. 11 is a block diagram of a radio network node according to some embodiments.

FIG. 11 illustrates a second radio network node 14-2 implemented in accordance with one or more embodiments. As shown, the second radio network node 14-2 includes processing circuitry 1000 and communication circuitry 1010. The communication circuitry 1010 is configured to transmit and/or receive information to and/or from one or more other nodes, e.g., via any communication technology. Such communication may occur via one or more antennas that are either internal or external to the second radio network node 14-2. The processing circuitry 1000 is configured to perform processing described above, e.g., in FIG. 8, such as by executing instructions stored in memory 1020.

Figure 12:
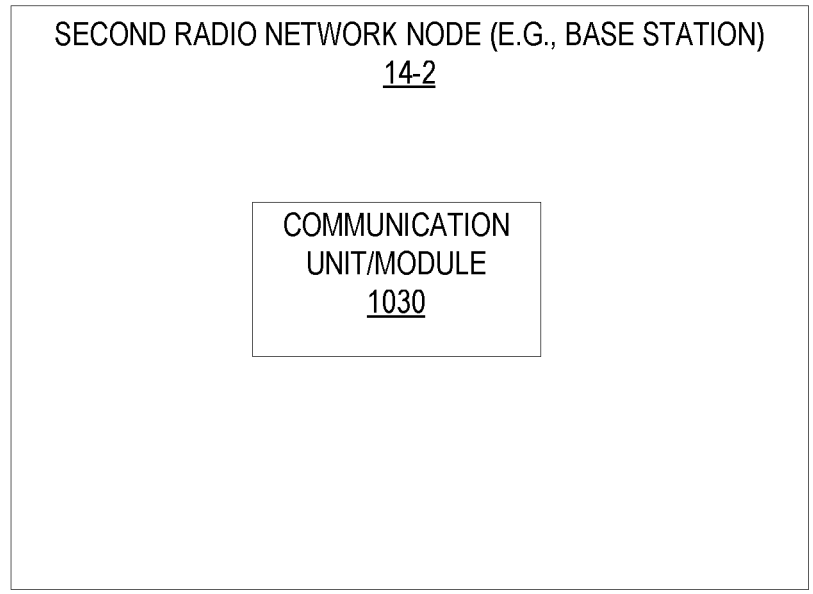
FIG. 12 is a block diagram of a radio network node according to other embodiments.

FIG. 12 illustrates a second radio network node 14-2 implemented in accordance with one or more other embodiments. As shown, the second radio network node 14-2 implements various functional means (or units), e.g., via the processing circuitry 1000 in FIG. 11 and/or via software code. These functional means, e.g., for implementing the method in FIG. 8, include for instance a communication unit or module 1030 for forwarding information relating to the first RAT 16-1 between the first RAT radio network node 14-1 and the second RAT module 18-2 of the wireless communication device 12.

Those skilled in the art will also appreciate that embodiments herein further include corresponding computer programs.

A computer program comprises instructions which, when executed on at least one processor of a radio node (e.g., wireless communication device 12 or second radio network nod 14-2), cause the radio node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

What is claimed is:

1. A method performed by a wireless communication device configured for use in a wireless communication system, the method comprising:
performing, by a first radio access technology, RAT, module of the wireless communication device, functions relating to a first RAT;
performing, by a second RAT module of the wireless communication device, functions relating to a second RAT; and
performing, by the second RAT module, a subset of the functions relating to the first RAT on behalf of the first RAT module when one or more defined conditions are met, the subset of the functions relating to the first RAT comprising:
receiving system information for the first RAT;
performing at least a portion of a random access procedure for the first RAT; and
performing signal measurements on the first RAT; and
operating, by the first RAT module, in a low-power mode, a sleep mode, or a disabled mode when the second RAT module performs the subset of the functions relating to the first RAT on behalf of the first RAT module;
wherein the one or more defined conditions include a remaining battery level of the wireless communication device being below a defined threshold.

2. The method of claim 1, further comprising, responsive to determining that a function relating to the first RAT is to be performed but is not included in the subset of the functions that the second RAT module is configured to perform on behalf of the first RAT module, transmitting signaling to the first RAT module that prompts the first RAT module to exit the low-power module, the sleep mode, or the disabled mode.

3. The method of claim 1, wherein performing, by the second RAT module, the subset of the functions relating to the first RAT on behalf of the first RAT module comprises performing the subset of the functions when the second RAT module is in an active mode in order to handle performance of at least one function relating to the second RAT.

4. The method of claim 1, wherein performing, by the second RAT module, the subset of the functions relating to the first RAT on behalf of the first RAT module comprises performing the subset of the functions when the second RAT module is not actively communicating using the second RAT.

5. The method of claim 1, wherein the subset of the functions relating to the first RAT further comprises radio resource control, RRC, IDLE mode functions and/or RRC INACTIVE mode functions for the first RAT.

6. The method of claim 1, wherein the subset of the functions relating to the first RAT further comprises performing paging operations for the first RAT.

7. The method of claim 1, wherein the subset of the functions related to the first RAT further comprises performing at least a portion of a procedure to setup or resume a radio resource control, RRC, connection on the first RAT.

8. The method of claim 1, wherein the subset of the functions relating to the first RAT further comprises transmitting or receiving user data via the first RAT when:
an amount of the user data over a defined time period is less than a defined amount threshold;
a frequency of transmitting or receiving the user data is less than a defined frequency threshold; and/or
a latency requirement for the user data is more than a first defined latency requirement and/or a second defined latency requirement.

9. The method of claim 1, wherein the subset of the functions relating to the first RAT further comprises transmitting or receiving information relating to the first RAT, and the method further comprises the second RAT module transmitting or receiving the information via a second RAT base station.

10. The method of claim 1, further comprising, by both the first RAT module and the second RAT module, invoking a generic RAT module of the wireless communication device for performing the subset of the functions relating to the first RAT radio, wherein the generic RAT module is configured to perform the subset of the functions for both the first RAT and the second RAT.

11. The method of claim 1, wherein the first RAT module and the second RAT module share the same, or have in common the same type of, one or more of: radio frequency circuitry, sampling circuitry, Fourier transform circuitry, and synchronization signal detection circuitry.

12. The method of claim 1, wherein the first RAT is New Radio and the second RAT is Long Term Evolution, or the first RAT is Long Term Evolution and the second RAT is New Radio.

13. The method of claim 1, wherein the first RAT module comprises a first RAT chipset and the second RAT module comprises a second RAT chipset.

14. The method of claim 1, wherein the first RAT module and the second RAT module are each hosted on a shared chipset.

15. The method of claim 1, wherein the first RAT module and the second RAT module each comprise or are hosted on circuitry.

16. The method of claim 1, wherein the wireless communication device is a user equipment.

17. A wireless communication device configured for use in a wireless communication system, the wireless communication device comprising:
processing circuitry and memory, the memory containing instructions executable by the processing circuitry wherein the wireless communication device is configured to implement:
a first radio access technology, RAT, module configured to:
perform functions relating to a first RAT; and
operate in a low-power mode, a sleep mode, or a disabled mode when the second RAT module performs a subset of the functions relating to the first RAT on behalf of the first RAT module; and
a second RAT module configured to:
perform functions relating to a second RAT; and
perform the subset of the functions relating to the first RAT on behalf of the first RAT module when one or more defined conditions are met;
wherein the subset of the functions relating to the first RAT comprise:
receiving system information for the first RAT;
performing at least a portion of a random access procedure for the first RAT; and
performing signal measurements on the first RAT; and
wherein the one or more defined conditions include a remaining battery level of the wireless communication device being below a defined threshold.

18. The wireless communication device of claim 17, wherein the second RAT module is further configured to, responsive to determining that a function relating to the first RAT is to be performed but is not included in the subset of the functions that the second RAT module is configured to perform on behalf of the first RAT module, transmit signaling to the first RAT module that prompts the first RAT module to exit the low-power mode, the sleep mode, or the disabled mode.

19. The wireless communication device of claim 17, wherein to perform the subset of the functions relating to the first RAT on behalf of the first RAT module, the second RAT module is configured to perform the subset of the functions when the second RAT module is in an active mode in order to handle performance of at least one function relating to the second RAT.

20. The wireless communication device of claim 17, wherein to perform the subset of the functions relating to the first RAT on behalf of the first RAT module, the second RAT module is configured to perform the subset of the functions when the second RAT module is not actively communicating using the second RAT.

21. The wireless communication device of claim 17, wherein the subset of the functions relating to the first RAT further comprises radio resource control, RRC, IDLE mode functions and/or RRC INACTIVE mode functions for the first RAT.

22. The wireless communication device of claim 17, wherein the subset of the functions relating to the first RAT further comprises performing paging operations for the first RAT.

23. The wireless communication device of claim 17, wherein the subset of the functions related to the first RAT further comprises performing at least a portion of a procedure to setup or resume a radio resource control, RRC, connection on the first RAT.

24. The wireless communication device of claim 17, wherein the subset of the functions relating to the first RAT further comprises transmitting or receiving user data via the first RAT when:
an amount of the user data over a defined time period is less than a defined amount threshold;
a frequency of transmitting or receiving the user data is less than a defined frequency threshold; and/or
a latency requirement for the user data is more than a first defined latency requirement and/or a second defined latency requirement.

25. The wireless communication device of claim 17, wherein the subset of the functions relating to the first RAT further comprises transmitting or receiving information relating to the first RAT, and wherein the second RAT module is further configured to transmit or receive the information via a second RAT base station.

26. The wireless communication device of claim 17, wherein the first and second RAT modules are both configured to invoke a generic RAT module of the wireless communication device for performing the subset of the functions relating to the first RAT radio, wherein the generic RAT module is configured to perform the subset of the functions for both the first RAT and the second RAT.

27. The wireless communication device of claim 17, wherein the first RAT module and the second RAT module share the same, or have in common the same type of, one or more of: radio frequency circuitry, sampling circuitry, Fourier transform circuitry, and synchronization signal detection circuitry.

28. The wireless communication device of claim 17, wherein the first RAT is New Radio and the second RAT is Long Term Evolution, or the first RAT is Long Term Evolution and the second RAT is New Radio.

29. The wireless communication device of claim 17, wherein the first RAT module comprises a first RAT chipset and the second RAT module comprises a second RAT chipset.

30. The wireless communication device of claim 17, wherein the first RAT module and the second RAT module are each hosted on a shared chipset.

31. The wireless communication device of claim 17, wherein the first RAT module and the second RAT module each comprise or are hosted on circuitry.

32. The wireless communication device of claim 17, wherein the wireless communication device is a user equipment.

33. A method performed by a second radio access technology, RAT, module configured for use in a wireless communication device that includes a first RAT module for performing functions related to a first RAT, the method comprising:
performing functions relating to a second RAT; and
performing a subset of the functions relating to the first RAT on behalf of the first RAT module when:
the first RAT module is operating in a low-power mode, a sleep mode, or a disabled mode; and
one or more defined conditions are met;
wherein the subset of the functions relating to the first RAT comprise:
receiving system information for the first RAT;
performing at least a portion of a random access procedure for the first RAT; and
performing signal measurements on the first RAT; and
wherein the one or more defined conditions include a remaining battery level of the wireless communication device being below a defined threshold.

34. A second radio access technology, RAT, module configured for use in a wireless communication device that includes a first RAT module for performing functions related to a first RAT, the second RAT module comprising:
processing circuitry and memory, the memory containing instructions executable by the processing circuitry wherein the second RAT module is configured to:
perform functions relating to a second RAT; and
perform a subset of the functions relating to the first RAT on behalf of the first RAT module when:
the first RAT module is operating in a low-power mode, a sleep mode, or a disabled mode; and
one or more defined conditions are met;
wherein the subset of the functions relating to the first RAT comprise:
receiving system information for the first RAT;
performing at least a portion of a random access procedure for the first RAT; and
performing signal measurements on the first RAT; and
wherein the one or more defined conditions include a remaining battery level of the wireless communication device being below a defined threshold.

* * * * *

UNITED STATES PATENT AND TRADEMARK OFFICE
CERTIFICATE OF CORRECTION

PATENT NO. : 11,363,534 B2
APPLICATION NO. : 15/561380
DATED : June 14, 2022
INVENTOR(S) : Åström et al.

It is certified that error appears in the above-identified patent and that said Letters Patent is hereby corrected as shown below:

In the Specification

In Column 2, Line 7, delete "performance" and insert -- performance of --, therefor.

In Column 5, Line 29, delete "(iv)" and insert -- (v) --, therefor.

In Column 6, Line 47, delete "subset 20-1S of functions 20-1" and insert -- subset 22-1S of functions 22-1 --, therefor.

In Column 6, Line 55, delete "subset 20-1S" and insert -- subset 22-1S --, therefor.

In Column 7, Line 11, delete "subset 20-1S of functions 20-1" and insert -- subset 22-1S of functions 22-1 --, therefor.

In Column 8, Line 2, delete "subset 22-1" and insert -- subset 22-1S --, therefor.

In Column 8, Line 5, delete "subset 20-1S" and insert -- subset 22-1S --, therefor.

In Column 8, Line 8, delete "an wake" and insert -- a wake --, therefor.

In Column 8, Line 19, delete "exist" and insert -- exit --, therefor.

In Column 11, Line 8, delete "nod" and insert -- node --, therefor.

In Column 13, Line 19, delete "type device" and insert -- type of device --, therefor.

In Column 13, Line 31, delete "table" and insert -- tablet --, therefor.

In Column 13, Line 32, delete "equipped" and insert -- equipment --, therefor.

Signed and Sealed this
Eleventh Day of October, 2022

Katherine Kelly Vidal
*Director of the United States Patent and Trademark Office*

CERTIFICATE OF CORRECTION (continued)
U.S. Pat. No. 11,363,534 B2

In Column 14, Line 55, delete "include" and insert -- includes --, therefor.

In Column 15, Line 25, delete "include" and insert -- includes --, therefor.

In Column 15, Line 36, delete "nod" and insert -- node --, therefor.

In the Claims

In Column 17, Line 35, in Claim 17, delete "the second RAT module" and insert -- a second RAT module --, therefor.

In Column 17, Line 38, in Claim 17, delete "a second RAT module" and insert -- the second RAT module --, therefor.